United States Patent [19]

Tamai

[11] Patent Number: 4,930,457
[45] Date of Patent: Jun. 5, 1990

[54] TEMPERATURE-OPERATED FLUID FRICTION COUPLING

[75] Inventor: Kunio Tamai, Numazu, Japan

[73] Assignee: Usui Kokusai Sangyo Kaisha Ltd., Shizuoka, Japan

[21] Appl. No.: 284,061

[22] Filed: Dec. 12, 1988

[30] Foreign Application Priority Data

Dec. 28, 1987 [JP] Japan .................... 62-197347[U]

[51] Int. Cl.⁵ .................................... F16D 43/25
[52] U.S. Cl. ........................ 123/41.12; 192/82 T
[58] Field of Search .......... 123/41.12; 192/58 B, 192/82 T

[56] References Cited

U.S. PATENT DOCUMENTS

| | | | |
|---|---|---|---|
| 3,642,105 | 2/1972 | Kikuchi | 192/58 B |
| 4,381,051 | 2/1981 | Kikuchi | 192/82 T |
| 4,446,952 | 5/1984 | Masai | 192/82 T |
| 4,485,902 | 12/1984 | Storz | 192/58 B |
| 4,606,445 | 8/1986 | Rockey | 192/82 T |
| 4,662,495 | 5/1987 | Brunken | 192/58 B |

Primary Examiner—Noah P. Kamen
Attorney, Agent, or Firm—Wenderoth, Lind & Ponack

[57] ABSTRACT

A temperature-operated fluid friction coupling is actuated by a flow of viscous fluid flowing into or out of shearing surface gaps disposed therein. The coupling of the invention includes an additional valve opening penetrating a partition and an additional valve lever mounted on the partition. The additional valve lever is made of a bimetallic element or bidirectional shape memory alloys such that it curves at a considerably low temperature near the standard ambient temperature, allowing the second valve opening to open and close. Thus, the fan idling speed during OFF condition of the coupling can be set considerably low in comparison with conventional designs.

6 Claims, 2 Drawing Sheets

TEMPERATURE-OPERATED FLUID FRICTION COUPLING

BACKGROUND OF THE INVENTION

This invention relates to a temperature-operated fluid friction coupling for intermittently driving a cooling fan of an internal combustion engine.

In a typical design of a temperature-operated fluid friction coupling, a housing is rotatably supported on a drive input shaft adapted to connect with an internal combustion engine, and the interior space of the housing is divided into a reservoir chamber and a torque transmitting chamber by a partition. On the drive input shaft a rotor is fixed so as to form mutually opposite shearing surface gaps between the housing and the rotor. A cooling fan is attached to an outer surface of the housing which comprises a front cover and a rear body. To the outer surface of the front cover is mounted a temperature-sensitive element made of a bimetal which curves in response to a change of ambient temperature. In the partition, a valve opening is provided and a valve lever for opening and closing the valve opening is mounted. The valve lever is initially stressed in the opening direction. Between the bimetal and the valve lever is disposed an actuating pin which transmits a deformation of the bimetal to the valve lever. As the bimetal is deformed by a change of the ambient temperature, the valve lever is moved toward the same direction through the actuating pin, allowing the valve opening to open or close. Then, viscous fluid flows into or out of the shearing surface gaps to effect or break the torque transmitting performance.

The ambient temperature sensed by the bimetal is generally the temperature of air after having passed through a radiator. For example, at a low temperature below 65° C., the bimetal is kept in a relatively flat shape and the valve lever closes the valve opening. In this situation, viscous fluid is raked out by a dam from the torque transmitting chamber to the reservoir, whereby the fluid-friction coupling is kept in OFF condition. Conversely, at a high temperature above 65° C., the bimetal curves toward the outer direction of the housing permitting the free end of the valve lever to separate from a periphery of the valve opening. In this situation in turn, the viscous fluid flows from the reservoir to the torque transmitting chamber, whereby the fluid-friction coupling is turned into ON condition.

Referring to FIG. 6 of the accompanying drawings in which revolution speeds of a fan attached to a coupling are plotted in relation to air temperatures, the performance curves B represent general characteristics of a conventional fluid-friction coupling in the prior art. For example, under the condition that an input speed from an engine is 2000 rpm, if the air temperature is below 65° C. and the coupling is kept in an OFF condition, the revolution speed of the fan is kept at nearly 900 rpm. This is recognized to be a kind of creeping revolution caused by a relatively small transmitting torque produced by a residual viscous fluid within the shearing surface gaps as well as produced by a bearing friction between the housing and the input shaft. Conversely, if the air temperature becomes above 65° C. and the coupling is turned into ON condition, the transmitting torque is increased, thereby casing the revolution speed of the fan to rise to 1800 rpm.

Since the horsepower absorbed by the fan increases in proportion to the third power of the number of revolutions, accompanied by a great consumption of fuel, it is most desirable to keep a fan idling speed during the OFF condition of the coupling as low as possible, from the view points of reducing the fuel consumption and avoiding the generation of noise. In prior designs, however, the fan idling speed should be set about 900 to 1100 rpm due to the following reasons.

In recent years, popular cars are generally equipped with air conditioners. If a switch of the air conditioner is turned to its ON position immediately after the starting of the engine, the temperature of the condenser of the air conditioner will rise quickly. At this moment, if the fan speed is below 500 rpm, the air flow is so small that the temperature as well as the pressure of refrigerant in the condenser rises excessively. Then, a safety plug is melted or a safety valve is released, resulting in need of repair. Therefore, it has been believed difficult to lower the fan idling speed less than the conventional setting of 900 to 1100 rpm. Under the situation, it is also difficult to suppress the noise during the low temperature time immediately after the starting of the engine. Furthermore, during a warming up time in winter morning, although there is no chance to use the air conditioner, the fan speed becomes higher than necessary, resulting in an extension of the warming up time and consumption of fuel.

SUMMARY OF THE INVENTION

It is an object of the present invention to provide a temperature-operated fluid friction coupling which can lower the fan idling speed and can reduce the fan idling noise during the OFF condition of the coupling.

Another object of the present invention is to lessen the warming up time in winter and to improve the acceleration performance when starting of a car, even if started before completing the warming up time.

Still another object of the present invention is to reduce fuel consumption, accompanied by a reduction of the fan idling speed.

According to the characteristics of the invention, a second valve opening is provided with the partition at a position nearer to the drive input shaft than the first valve opening, and a second valve lever made of a temperature-sensitive element such as a bimetal or bi-directional shape memory alloys is supported on the partition. The second valve lever is adapted to curve at a predetermined temperature, for example 15° C., which is near the standard ambient temperature of 20° C., thereby opening and closing the second valve opening. Thus, the fluid communication between the reservoir and the chamber is controlled in two ways depending upon the workings of the first and second valve levers. Since the second valve opening is positioned nearer to the drive input shaft than the first valve opening, the fan revolution speed during OFF condition of the coupling is controlled in two stages.

The temperature at which the second valve lever begins to curve should be selected with regard to the ambient temperature such that there is no possibility of switching-ON of the air conditioner in winter, or that the temperature of a condenser would not excessively rise after the switching-ON. Accordingly, it is preferable to set the temperature about 10° to 20° C. Thus, the fan idling speed during OFF condition of the coupling, which has been set relatively high in the prior designs, can be set relatively low such as 500 rpm, whereby technical advantages such as a reduction of the fan idling noise, a reduction of the warming up time, and a reduction of the fuel consumption are obtained.

Other objects, features and advantages of the invention will become apparent from a reading of the specification when taken in conjunction with the drawings in which, like reference numerals refer to like elements in the several views.

DESCRIPTION OF THE PREFERRED EMBODIMENT

Figure 1:
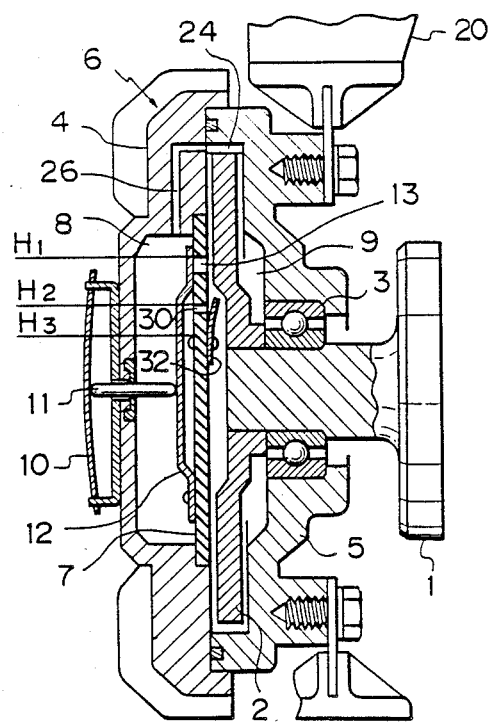
FIG. 1 shows a longitudinal section through a fluid friction coupling according to the invention.

Referring to FIG. 1, there is shown a preferred embodiment of the temperature-operated fluid friction coupling according to the present invention, in which a housing 6 is rotatably supported on a drive input shaft 1 by means of a bearing 3, and the interior space of the housing 6 is divided into a reservoir chamber 8 and a torque transmitting chamber 9 by a partition 7. The shaft 1 can be connected to an output shaft of an engine by way of joint flanges. To the distal end of the shaft 1 is fixed a rotor 2 such that it forms mutually opposite shearing surface gaps between the housing 6 and the rotor 2. The housing 6 comprises a front cover 4 and an associating rear body 5 to which a cooling fan 20 is bolted. To the outer surface of the front cover 4 is mounted a temperature-sensitive element 10 made of a bimetal which can curve in response to a change of the ambient temperature. In the partition 7, a valve opening 13 is provided and a first valve lever 12 is mounted thereon such that it can open and close the valve opening 13. The valve lever 12 is initially stressed in the opening direction. Between the bimetal 10 and the first valve lever 12 is disposed an actuating pin 11 so as to transmit a deformation of the bimetal 10 to the first valve lever 12. In the same manner as in the conventional coupling, as the bimetal 10 is curved by a change of the ambient temperature, the first valve lever 12 is moved toward the same direction through the actuating pin 11, allowing the valve opening 13 to open or close. Then, the viscous fluid flows into or out of the shearing surface gaps to effect or to break the torque transmitting performance.

At a position near the periphery of the rotor 2 is provided a dam 24 for raking out the viscous fluid within the torque transmitting chamber 9. The fluid raked out by the dam returns into the reservoir 8 through a circulating passage 26.

Figure 2:
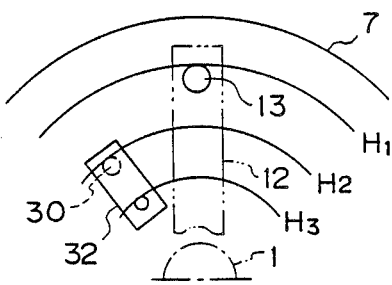
FIG. 2 is a partial front view of a partition having first and second valve levers thereon.

Based upon the characteristics of the invention, a second valve opening 30 is provided penetrating the partition 7 at a position nearer to the input shaft 1 than the first valve opening 13, and a second valve lever 32 for opening and closing the second opening 30 is mounted adjacent the second opening 30. An example of an arrangement of the first valve opening 13 and the second valve opening 30 is illustrated in FIG. 2. The base end of the second valve lever 32 is fixed to the partition 7 and the free end of the lever 32 is repeatedly subjected to deformation under the changes of temperature of surroundings, thereby allowing the second opening 30 to open and close. The second valve lever 32 is made of a bimetallic element or bidirectional shape memory alloys so as to effect the bending performance.

Figure 3:
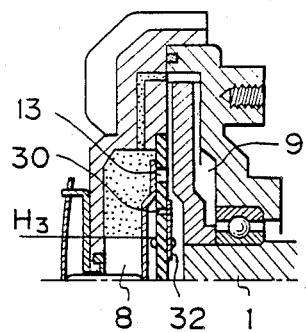
FIGS. 3, 4 and 5 show representations in principle of different operating conditions of the coupling according to FIG. 1.

The second valve lever 32 is constructed such that its deformation occurs at a temperature of 15° C. near the standard ambient temperature of 20° C. As shown in FIG. 3, under the condition below the temperature of 15° C., the second valve lever 32 is kept in almost a flat shape, completely shutting down the second opening 30. As stated above, the first valve lever 12 is generally constructed such that its deformation occurs at a temperature of 65° C., so that under the condition of FIG. 3 the first valve lever 12 is also completely shutting down the first valve opening 13. Thus, viscous fluid such as silicone oil is filled up to the level of H3 within the reservoir 8. On the other hand, within the torque transmitting chamber 9, there remains only a little fluid. Accordingly, under the condition of FIG. 3, the fluid coupling is kept in OFF condition, allowing the fan idling speed to maintain about 500 to 600 rpm, as illustrated in curves A in FIG. 6. This idling speed can be adjusted by controlling the quantity of the viscous fluid and the degree of friction of the bearing 3 which is usually provided with a seal member.

Figure 4:
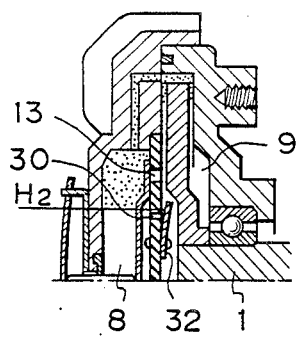

When the temperature of air having passed through the radiator goes up to the range from 15° C. to 65° C., the second valve lever 32 curves permitting its free end to leave the surface of the partition 7, whereby the second valve opening 30 is opened. In this way, a part of the fluid flows from the reservoir 8 to the torque transmitting chamber 9. Then, as shown in FIG. 4, within the reservoir 8 the viscous fluid is filled up to the level of H2, and also within the chamber 9 a small quantity of fluid is collected. Thus, the fan speed goes up to the range from 900 to 1000 rpm.

Figure 5:
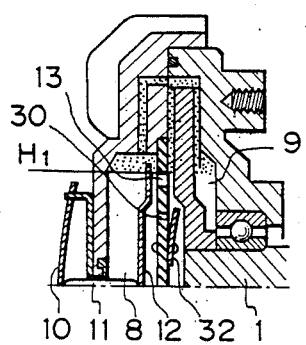

When the temperature of air having passed through the radiator further goes up above 65° C., the bimetal 10 curves permitting the actuating pin 11 to move toward left direction of FIG. 1 and subsequently permitting the free end of the first valve lever 12 to leave the surface of the partition 7, whereby the first valve opening 13 is opened. In this way, a large quantity of viscous fluid within the reservoir 8 flows into the torque transmitting chamber 9. Then, as shown in FIG. 5, within the reservoir 8 the viscous fluid is filled up to the level of H1, and also within the chamber 9 a considerable amount of fluid is collected. Thus, the fan speed goes up to the range from 1000 to 3000 rpm depending upon the input speed from the engine.

Figure 6:
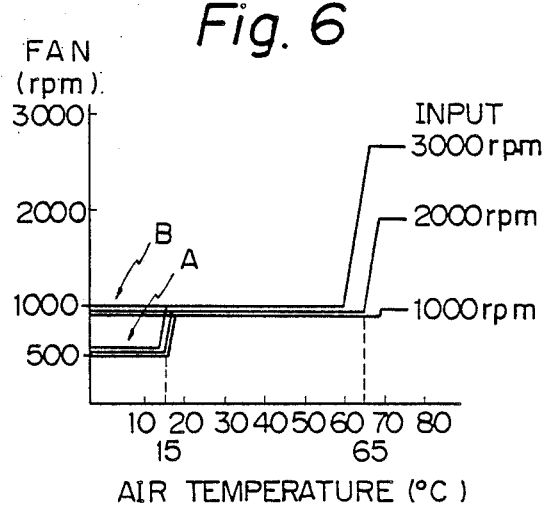
FIG. 6 is a graph illustrating different characteristics of the couplings according to the invention and the prior art.

As stated above, the graph in FIG. 6 illustrates different curves A and B. According to the invention, the fan speed changes along the curves A in comparison with the curves B in conventional couplings. It should be appreciated that the present invention is directed to reduce the fan idling speed during OFF condition of the coupling.

In order to obtain optimum operating conditions under a specific application, the operating temperatures of the valve levers and the fan idling speed can be adjusted by controlling the distances from the openings to the input shaft or the distance between the openings, or the sizes of the openings.

In FIG. 1, the second valve lever 32 is illustrated on the side facing the rotor 2 for the purpose of clarifying the drawing. It should be appreciated that the second valve lever 32 can be mounted on opposite side of the partition 7 in a specific application.

Thus, as is apparent from the above description, the temperature-operated fluid friction coupling of the invention can provide technical advantages as follows:

(1) Since the fan idling speed under the condition of low ambient temperature such as in winter can be set considerably low, the fan noise during the idling operation of an engine is considerably reduced.

(2) Since the rotation speed of the cooling fan during a warming up time such as in winter is considerably low, within a short time warming up can be finished.

(3) Even if a car starts before completing the warming up, good accelerating performance is attained because the fan speed at the moment is relatively low.

(4) Since the fan idling speed during the OFF condition of the coupling is considerably low, fuel consumption is saved.

I claim:

1. A temperature operated fluid friction coupling for intermittently driving a cooling fan of an internal combustion engine, the internal combustion engine having a drive input shaft, and said coupling comprising:

a housing defining an interior space provided so as to be rotatably supportable on the input drive shaft for supporting the cooling fan of the internal combustion engine;

a rotor fixable on the drive input shaft and disposed in said interior space of said housing so as to define shearing surface gaps between itself and said housing;

a partition for dividing said interior space of said housing into a fluid reservoir and a torque transmitting chamber, said rotor being located in said torque transmitting chamber adjacent said partition;

first valve means for supplying fluid to said rotor in said torque transmitting chamber from said reservoir at a predetermined, relatively high ambient temperature, said first valve means including a first valve opening in said partition between said reservoir and said chamber, a valve member supported on said partition for opening and closing said valve opening, a bimetallic element disposed outside of said housing, and an actuating pin extending through said housing, an outer end of said actuating pin abutting with said bimetallic element and the inner end of said pin abutting with said valve member, wherein said bimetallic element is adopted to curve at said predetermined relatively high temperature; and second valve means for supplying fluid to said rotor in said torque transmitting chamber from said reservoir at a second predetermined temperature lower than said high ambient temperature, said second valve means including a second valve opening in said partition between said reservoir and said chamber and a second valve member on said partition made of a temperature-sensitive material for opening and closing said second valve opening, wherein said second valve member is adapted to curve at said second predetermined temperature to enable said second valve opening to be opened and closed.

2. The temperature operated fluid friction coupling as set forth in claim 1, wherein there is one and only one said rotor in said housing.

3. The temperature operated fluid friction coupling as set forth in claim 1, wherein:

said second valve member made of said temperature-sensitive material is directly connected to said partition.

4. The temperature operated fluid friction coupling as set forth in claim 1, wherein:

said rotor located in said torque transmitting chamber adjacent said partition has a space between itself and said partition; and both said valve openings in said partition are in direct fluid communication with said space.

5. The temperature operated fluid friction coupling as set forth in claim 1, wherein:

said first valve member is biased toward an open position away from said first valve opening.

6. The temperature operated fluid friction coupling as set forth in claim 1, wherein:

said first valve member is in said fluid reservoir and said second valve member is in said torque transmitting chamber.

* * * * *